SCANNING RECORDER

Filed Jan. 12, 1951 2 SHEETS—SHEET 1

INVENTORS
H. A. Stamper
B. G. Blackman
D. O. Nelson
BY Ellwoodbury
ATTORNEY

SCANNING RECORDER

Filed Jan. 12, 1951 2 SHEETS—SHEET 2

INVENTORS
H. A. Stamper
B. G. Blackman
D. O. Nelson
BY E. A. Woodbury
ATTORNEY

Patented Oct. 21, 1952

2,614,903

UNITED STATES PATENT OFFICE 2,614,903

SCANNING RECORDER

Hamilton A. Stamper, Birt G. Blackman, and Donald O. Nelson, Los Angeles, Calif., assignors to Bendix Aviation Corporation, South Bend, Ind., a corporation of Delaware Application January 12, 1951, Serial No. 205,771

14 Claims. (Cl. 346—139)

This invention relates to recording instruments in which record marks are made on a paper tape or the like by electrically energizing a stylus that is repeatedly traversed or scanned across the tape.

An object of the invention is to simplify and reduce the cost of the mechanism for traversing the stylus across the tape.

Another object is to reduce the power required to traverse the stylus.

Another object is to provide a scanning recorder having a scanning mechanism of extremely simple and inexpensive type in which the record is not obscured by the scanning mechanism, and in which newly recorded marks are immediately visible.

Other more specific objects and features of the invention will appear from the description to follow:

There is disclosed in application for U. S. Letters Patent of H. A. Stamper, Serial No. 42,052, filed August 2, 1948, and since issued as Patent 2,593,068 on April 15, 1952, a novel scanning recorder in which scanning is effected by a long, flexible spring wire stylus member secured at one end to the periphery of a light, rotating, drum mounted substantially perpendicular to the paper and closely adjacent thereto. The stylus member is adapted to bend around the drum as its tip drags across the tape from one side thereof to the other, in response to the drum rotation. By locating the axis of the drum adjacent the trailing edge of the tape (with respect to the direction of stylus movement) the stylus winds about the drum throughout the time of traverse of the tape by the stylus tip. In other words, during traverse of the stylus tip across the tape, it moves substantially tangent to the drum at a uniform speed equal to the peripheral speed of the drum. After the stylus tip leaves the tape the stylus unwinds from the drum while the latter is turning through the angle necessary to again bring the tip back to the leading edge of the tape.

The scanning mechanism disclosed in this prior application has the great advantage that the stylus and the drum can be of very light construction so that the assembly can be rotated by a relatively small motor. A disadvantage of the particular construction disclosed in said application is that the stylus drum is mounted perpendicular to the paper tape at the scanning path thereacross that is traversed by the stylus tip, and this necessitates either that the drum project a considerable distance in front of the plane of that portion of the tape that is viewed, or that the tape be bent around a sharp corner immediately before it is brought into view, and the drum mounted substantially parallel to the plane of the portion of the tape that is exposed in view. It is sometimes undesirable in practice to position the drum in front of that portion of the tape that is exposed to view, and it is objectionable to scan a portion of the tape that is not in view because the newly made record is then not immediately visible.

The present invention overcomes the mentioned defects of the prior structure by mounting the drum parallel to and approximately in the plane of the stretch of the record tape that is exposed to view, and providing a stylus guiding bar or track in front of the tape that restrains the stylus tip to linear movement while the stylus is traversing the record tape.

A full understanding of the invention and the advantages thereof may be had from the following detailed description with reference to the drawing, in which.

Figures 1, 2:
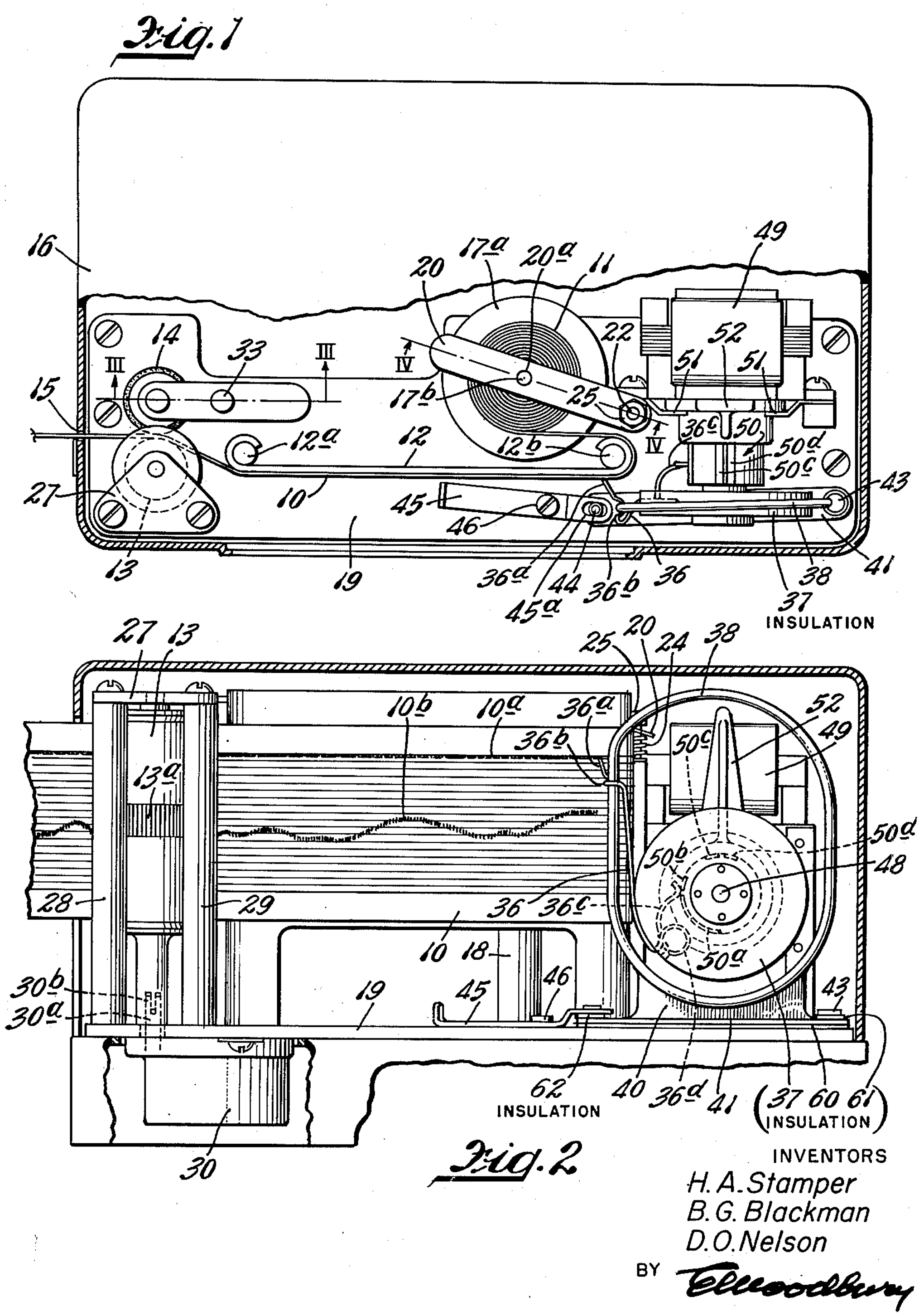
Fig. 1 is a plan view of a depth recorder incorporating a stylus mechanism in accordance with the invention, a portion of the case being broken away to show the interior elements.
Fig. 2 is a front elevation view of the apparatus, with portions of the case broken away to disclose the interior construction.
Figure 4:
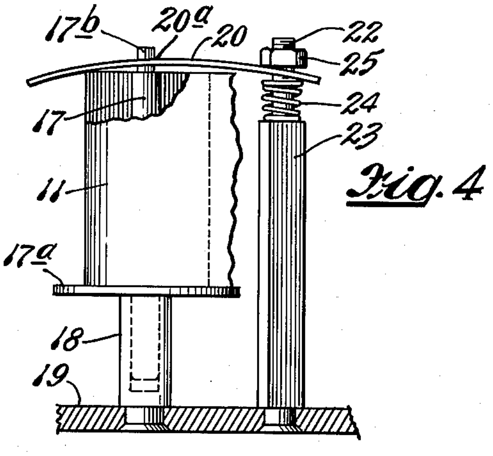
Fig. 4 is a detailed vertical section taken in the plane IV—IV of Fig. 1.

Referring to Fig. 1, there is shown a record blank consisting of a paper tape 10 which, during operation of the recorder, is slowly unwound from a roll 11 and drawn around the end of a backing plate 12, and across the front of that plate, by a pair of feed rollers 13 and 14, from which it flows through a slot 15 in the side of the case 16. The roll 11 of paper tape is supported upon a supply roller 17 (Fig. 4) which is freely rotatably supported in a socket 18 mounted on the base 19 of the instrument. The roller 17 is provided with a flange 17*a* at its lower end, to support the roll 11. To afford resistance to rotation of the roll 11, a brake consisting of a curved leaf spring 20 is provided at the upper end thereof. This spring 20 is maintained in substantial diametrical position across the upper end of the roll 11 by an aperture 20*a* therein which engages a small extension 17*b* extending from the upper end of the roller 17. To provide a desired tension to the spring 20, it is supported near one outer end on a stud 22 extending from the upper end of a post 23 which is secured at its lower end to the base 19. A helical compression spring 24 is provided on the stud 22 between the upper end of the post 23 and the leaf spring 20, and a nut 25 is provided on the stud 22 above the leaf spring 20. It will be observed from Fig. 4 that the leaf spring 20 bears against the roll 11 at the upper outer edge thereof, thereby applying a braking action to the roll 11 at its outer periphery irrespective of how much tape is on the roll. This provides a relatively constant braking force whether the roll 11 is large or is small. The extent of the braking force can be varied by adjusting the nut 25.

The opposite ends of the backing plate 12 are curved, as clearly shown in Fig. 1, and may be supported by posts 12*a* and 12*b* extending upwardly from the base 19.

Figure 3:
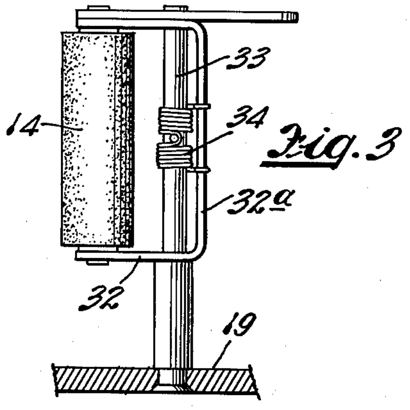
Fig. 3 is a detailed vertical section taken in the plane III—III of Fig. 1.

The feeder roller 13 is preferably knurled at the center, as indicated at 13*a* in Fig. 2, and is supported at its lower end for rotation in a bearing aperture in the base 19, and is supported at its upper end in a bearing aperture in a plate 27 that is supported by a pair of posts 28 and 29 extending upwardly from the base 19. The feed roller 13 is positively driven at a constant speed by a small constant-speed electric motor 30 which is mounted on the under side of the base 19. The motor 30 is of the type containing a gear case which greatly reduces the speed of its output shaft 30*a* which extends into a counterbore in the lower end of the roller 13 and is placed in driving relation thereto by a conventional tongue and groove coupling 30*b*. The idler roller 14 may be rotatably supported in a yoke 32 (Fig. 3) which is pivotally supported on a post 33 extending upwardly from the base 19. A torsion spring 34 on the post 33 engages the crossbar portion 32*a* of the yoke and applies a constant torque thereto to urge the idler roller 14 against the paper tape 10 and press the latter against the drive roller 13.

The record tape 10 is adapted to be used in depth recording and is shown as having recorded thereon a base line 10*a* and a depth indicating line 10*b*. Each of the lines 10*a* and 10*b* consists really of a plurality of short vertical increments positioned so close together as to form substantially continuous record lines. These increments are successively recorded by the tip 36*a* of a stylus member 36, which is repeatedly dragged across the tape 10 from top to bottom, and has applied thereto electrical impulses, the timing of which determines the vertical positions of the increments on the tape. The present invention resides primarily in the stylus structure and the mechanism for moving it across the tape 10.

As shown in Fig. 2, the stylus member 36 consists of a length of spring wire, one end of which is secured to and extends from the periphery of a rotating stylus carrier in the form of a drum 37, and the free end or tip 36*a* of which contacts the paper tape 10 and consitutes the actual stylus. An intermediate portion 36*b* of the stylus member 36, near the tip 36*a*, is shaped to engage a closed track member 38 which guides the end of the stylus member during the rotation of the drum 37.

It will be observed from Fig. 2 that the tip 36*a* of the stylus member 36 is in position to form an increment in the base line 10*a* on the tape, and that the track contacting portion 36*b* of the stylus member is engaging a straight vertical section of the track 38. It will further be noted that the stylus member 36 is being bent around the periphery of the drum 37, and that as the (counterclockwise) rotation of the drum 37 continues, more and more of the stylus member 36 will be wrapped around the drum. This results in the free end 36*a* of the stylus member being moved downwardly at a substantially constant speed while the portion 36*b* of the stylus member is traversing the straight section of the track 38, and this will result in the path of the tip 36*a* across the tape 10 being substantially vertical and straight. After the track-engaging portion 36*b* of the stylus member has passed the vertical straight portion of the track 38, it moves over a lower circular track section substantially concentric with respect to the hub 37, during which interval the stylus remains largely wrapped around the drum. Thereafter it moves over a short vertical straight section which gradually curves outwardly at the upper end to permit the stylus 36 to unwrap from the drum preparatory to its next run downwardly through the vertical, working portion of its travel.

To support the track 38 it is welded or brazed, at its lower end, to a supporting web 40 which extends upwardly from a track base 41 which is pivotally held against the base 19 by a pivot screw 43 at one end. At the other end of the track base 41 there is provided an upstanding pin 44 which is engaged by a slot 45*a* in one end of a lever 45 which is fulcrumed to the base 19 by a screw 46. The pivot screws 43 and 46 hold the track base 41 against the main chassis base 19 with sufficient friction to retain it in whatever position it may be moved to. However, the left end of the base 41 may be shifted by oscillating the lever 45. This adjusting movement is provided to permit adjustment of the tip 36*a* of the stylus member into proper recording contact with the paper tape 10.

The drum 37 is mounted on the outer end of the shaft 48 of a constant-speed motor 49. Positioned concentrically about the shaft 48, between the motor 49 and the drum 37, is a commutator structure 50 which is mounted against the face of the motor 49 and yieldably held against rotation by spring clips 51. A handle 52 extending upwardly from the commutator structure 50 permits limited oscillation of the commutator structure for phasing adjustment. One end 36*c* of the stylus member 36, which is the end thereof opposite the stylus tip 36*a*, extends from the drum 37 against the face of the commutator 50 and constitutes a brush cooperating with the commutator segments 50*a*, 50*b*, 50*c* and 50*d* to control the electrical circuit of a depth recorder.

Figure 7:
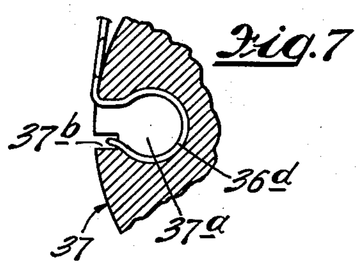
Fig. 7 is a detailed section taken in the plane VII—VII of Fig. 6 showing the manner of attaching the stylus to the drum.

Various methods may be employed for anchoring the stylus member to the hub 37, but a convenient method is to form a recess 37*a* (Fig. 7) extending inwardly from the periphery of the hub 37 and enlarged interiorly. The stylus member 36 is then provided with a loop section 36*d* which fits into the recess 37*a* and holds the stylus securely. The stylus member has sufficient resilience to permit compressing the loop portion 36*b* sufficiently to pass it in or out of the mouth of the recess 37*a*. The section 36*c* of the stylus may extend from the section 36*d* through a slot 37*b* which extends from the recess 37*a* through the side of the drum 37.

Although a stylus member consisting of a simple spring wire has been satisfactory in most applications, it may be desirable in order to secure more accurate tracking in a straight path at constant speed to employ special constructions of the stylus member which provide greater resilience or yieldability near the end attached to the carrier or drum 37 than near the free end. Two stylus structures having this characteristic are illustrated in Figs. 5 and 6.

Figure 5:
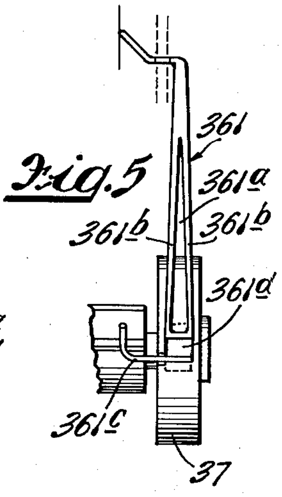
Fig. 5 is a detailed view showing an alternative form of stylus.

In Fig. 5, the stylus member 361 instead of being formed of wire is formed of strip sheet stock of increasing cross-sectional area from the end attached to the carrier or hub to the free end. It is also desirable to provide relative stiffness to lateral movement, and to this end the stylus member 361 is wider at the end attached to the carried or hub 37 than it is at the free end, but the cross-sectional area is diminished near the carrier end by providing an elongated slot 361*a* in the flexing portion of the stylus, which slot is of substantially greater width at the carrier end than at the free end. Therefore, the two arms 361*b* on opposite sides of the slot 361*a* are of progressively greater width from the carrier end toward the free end. With the construction of Fig. 5, the contact for the commutator 361*c* may consist of a piece of wire soldered, brazed or welded to that portion 361*d* of the stylus member that is engaged in the recess in the hub 37.

Figure 6:
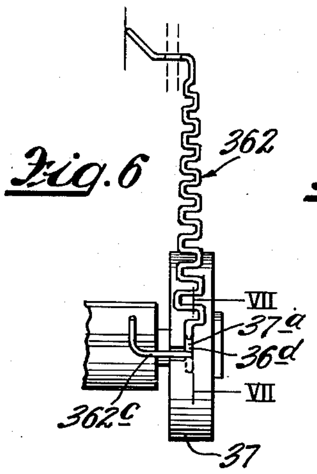
Fig. 6 is a detailed view similar to Fig. 5, but showing still another alternative form of stylus.

Referring to Fig. 6, another form of stylus structure having greater resilience near the carrier end than near the free end is shown. In this instance the stylus member 362 consists of a single length of spring wire that is convoluted back and forth upon itself throughout its flexing section, with the convolutions being of greater magnitude at the end nearest the drum 37 than at the free end. This provides greater yieldability to longitudinal bending around the drum 37 where the convolutions are of large amplitude than where they are of smaller amplitude.

The lines 10*a* and 10*b* are formed on the record tape 10 by an electrical discharge from the stylus tip 36*a*, and therefore the stylus member 36 and the track 38 are insulated from the frame of the instrument. The stylus member 36 is insulated from the motor shaft 48 by forming the drum 37 of insulating material. The track 38 is insulated from the frame of the instrument by providing an insulating strip 60 between the track base 41 and the chassis base 19, and providing insulating bushings 61 between the base 41 and the screw 43, and between the pin 44 and the lever 45. Desired electrical connection to the stylus member 36 is provided through the brush section 36*c* of the stylus and the commutator segments 50*a*, 50*b*, 50*c* and 50*d*, to which connections are made, as shown in the schematic diagram of Fig. 8. Thus the short segment 50*b* is connected through a double-throw switch 70 and a condenser 71 to the control grid 72 of a tube 73, the cathode 74 of which is connected to ground, and the anode 75 of which is connected through a resistor 76 to the positive terminal of a B supply 77, the negative terminal of which is grounded. The backing plate 12, across which the record tape moves, is also connected to ground. At the instant that the brush end 36*c* of the stylus member contacts both the segments 50*b* and 50*a*, it applies a positive potential from a condenser 78 through the segment 50*a* to the stylus member, and produces a discharge from the stylus tip 36*a* through the paper 10 to the backing plate 12 to produce an increment in the base line. Both plates of the condenser 78 were previously at the potential of the B supply 77, the positive terminal of which is connected through a reactance element 79 and a high resistance leak 80 to the segment 50*a*. The condenser 78 is charged by contact of a brush 36*c* with the segments 50*b* and 50*a*, since normally the high resistance 80 bridging the condenser 78 maintains it in discharged condition.

The potential derived from the condenser 78 is also applied through the segment 50*a* and the brush section 36*c* to the segment 50*b*, and through the switch 70 and the condenser 71 to the control grid 72 of the tube 73, causing that tube to become conductive (it being normally rendered non-conductive by the negative potential of a biasing battery 81 which is connected to the grid through a grid leak 82). When the tube 73 becomes conductive, a condenser 83 connected between the anode 75 of the tube and a tap 84 on an inductance element 85 is suddenly discharged through the lower portion of the inductance element 85 to ground, the current shocking an oscillatory circuit constituted by the inductance 85 and the distributed capacity of a transmission line 86 which connects the inductance 85 to a transducer 87. The resultant oscillations energize the transducer, causing it to transmit sonic waves of corresponding frequency. When an echo from the transmitted sonic waves is received by the transducer 87 it produces corresponding electric waves which are applied through the transmission line 86 and a resistance element 88 to the input end of an amplifier 89, the output end of which is connected by the condenser 78 to the segment 50*a*, and thence to the stylus 36 and through the paper tape 10 to the backing plate 12, producing another increment in the depth line 10*b*.

Figure 8:
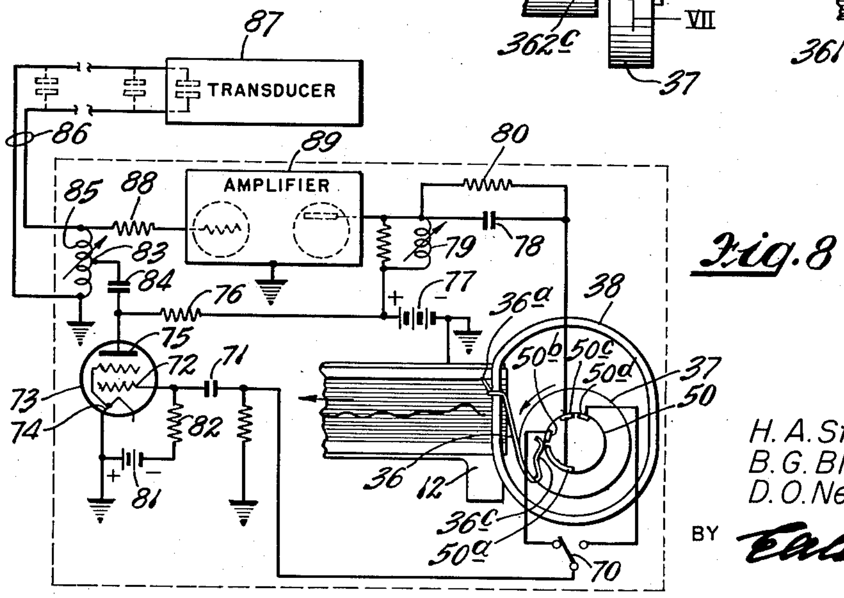
Fig. 8 is a schematic diagram of a circuit that may be employed with the invention.

It is to be understood that the general circuit of Fig. 8 as so far described is only one of many that can be used with recording apparatus described, and does not constitute a part of the present invention.

The contacts 50*c* and 50*d*, and the switch 70 are provided for the purpose of doubling the depth range of the recorder. Thus when the switch 70 is thrown to the right to connect the commutator segment 50*d* to the grid 72 of the tube 73, the latter is fired at the time the brush 36*c* interconnects the segments 50*d* and 50*c*, which occurs substantially in advance of the contact of segment 50*a* by the brush 36. The distance between the contacts 50*d* and 50*b* is so chosen that the time interval between interconnection of the segments 50*d* and 50*c* by the brush 36*c*, and the interconnection of the segments 50*b* and 50*a* by the brush, is equal to the time interval required for the stylus tip 36*a* to traverse the record tape. Therefore, following interconnection of the segments 50*d* and 50*c* by the brush 36*c*, the stylus tip 36*a* does not contact the upper edge of the recording area of the tape until sufficient time has elapsed to permit the sonic impulses from the transducer 87 to go to the bottom and return, when the distance to the bottom is equal to or greater than the maximum recording depth of the instrument when the switch 70 is in left position. The net result is that if the normal maximum depth of recording is 50 fathoms, the range can be extended to cover depths from 50 to 100 fathoms by throwing the switch 70 from its left to its right position.

It can be readily determined from inspection of the record whether the instrument was adjusted for normal depth or double depth, by noting the presence or absence of the base line 10a. When the instrument is set for recording at normal depths, that is, with switch 70 in left position, the base line 10a is recorded on the tape. However, when the switch 70 is thrown to the right for recording at double depths, the contact between the segments 50c and 50d occurs at a time before the contact of the stylus tip 36a with the record paper, and no record of the base line 10a is made.

Although for the purpose of explaining the invention a particular embodiment thereof has been shown and described, obvious modifications will occur to persons skilled in the art and we do not desire to be limited to the exact details shown and described.

We claim:

1. Apparatus of the type described comprising: means for supporting and moving a sheet record in transversely flat shape through a fixed record path past a fixed straight scanning path extending transversely across said record path; a scanning mechanism positioned entirely on the front side of said record path and including a stylus carrier and an elongated resilient stylus member attached at one end to said carrier and having a free scanning end; means rotatably supporting said carrier for continuous rotation about a fixed axis, and means for rotating it; said resilient stylus member when unrestrained extending from its point of attachment to said carrier in a direction having a radial component away from said axis; and means including a guide member positioned on the front side of said record path adjacent and parallel to said scanning path, and in the plane of rotation of a portion of said stylus member adjacent the end thereof for contacting said portion of the stylus member during the scanning portion of each revolution thereof and deflecting said scanning end into substantially linear travel through said scanning path.

2. Apparatus according to claim 1 in which said guide member constitutes a portion of a closed track approximately in the plane of rotation of said stylus member, and engaging and guiding said stylus member throughout each revolution of the stylus member.

3. Apparatus according to claim 1 in which said record path comprises a flat viewing section extending from said scanning path in the direction of movement of said record, the plane of rotation of said stylus member is approximately parallel to and in front of the plane of said flat viewing section of said record path, and said stylus carrier is positioned ahead of said guide member, whereby said viewing section of said record path is unobstructed by said scanning mechanism.

4. Apparatus according to claim 1 in which the axis of rotation of said stylus carrier is in a plane substantially normal to and intersecting said scanning path at the trailing end thereof, whereby said stylus member is increasingly bent during traverse of said scanning path by said free end.

5. Apparatus according to claim 1 in which said carrier has an outwardly facing curved peripheral surface extending rearwardly, with respect to the direction of rotation of the carrier, from the point of attachment of the stylus member to the carrier, for the stylus member to bend around during traverse of the scanning path by said free end.

6. Apparatus according to claim 5 in which said carrier is so spaced from said scanning path that during movement of said stylus end through said scanning path the portion of said stylus member between the free end thereof and said peripheral portion of the carrier is substantially parallel to said scanning path.

7. Apparatus according to claim 1 in which said stylus carrier has a peripheral surface containing a recess, and said stylus member comprises an elongated spring metal element having a loop therein dimensioned to fit in and be retained by said recess, one end of said element extending from said carrier substantially tangentially when said loop is positioned in and engaged by said recess.

8. Apparatus according to claim 7 including a stationary electrical contact structure adjacent said carrier, and in which that portion of said carrier in contact with said spring metal element is of electrical insulating material, and the other end of said element extends from said carrier into sliding contact with said stationary contact structure.

9. Apparatus according to claim 1 in which said resilient stylus member has progressively increasing stiffness to longitudinal bending from the end thereof attached to said carrier to the free end.

10. Apparatus according to claim 9 in which said stylus member comprises a wire laterally convoluted from side to side along its length.

11. Apparatus according to claim 10 in which the amplitude of the convolutions of said wire decreases from the carrier end to the free end of the stylus member.

12. Apparatus according to claim 1 in which said stylus member comprises an elongated spring element of progressively increasing cross-sectional area from its carrier end to its free end.

13. Apparatus according to claim 1 including means supporting said guide member for adjusting movement toward and away from said record path, and means for moving said guide member to vary the contact pressure of the stylus against the record.

14. Apparatus according to claim 1 including a stationary electrical contact structure comprising a plurality of contacts and means insulatingly supporting said contacts adjacent and concentric to the axis of said carrier; said stylus member having an extension extending from the stylus member adjacent its point of attachment to the carrier into sliding contact with said contacts for closing said contacts in synchronism with the movement of said stylus member.

HAMILTON A. STAMPER.
BIRT G. BLACKMAN.
DONALD O. NELSON.

REFERENCES CITED

The following references are of record in the file of this patent:

UNITED STATES PATENTS

| Number | Name | Date |
|---|---|---|
| 1,953,869 | Sadgebury | Apr. 3, 1934 |
| 2,121,902 | Crist, Jr. | June 28, 1938 |
| 2,511,195 | Buhrendorf et al. | June 13, 1950 |
| 2,539,553 | Rich | Jan. 30, 1951 |
| 2,557,196 | Nelson | June 19, 1951 |
| 2,561,345 | Deloraine | July 24, 1951 |